United States Patent
Sawayama et al.

(10) Patent No.: US 6,788,366 B2
(45) Date of Patent: Sep. 7, 2004

(54) DISPLAY DEVICE INCLUDING CORNER CUBE ARRAY

(75) Inventors: Yutaka Sawayama, Tenri (JP); Kiyoshi Minoura, Tenri (JP); Ichiro Ihara, Nishinomiya (JP); Koji Taniguchi, Nara (JP); Sayuri Fujiwara, Nara (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 10/327,951

(22) Filed: Dec. 26, 2002

(65) Prior Publication Data

US 2003/0117554 A1 Jun. 26, 2003

(30) Foreign Application Priority Data

Dec. 26, 2001 (JP) .................................... 2001-394992

(51) Int. Cl.[7] ...................... G02F 1/1335; G02B 5/122; G02B 5/124
(52) U.S. Cl. ...................... 349/113; 349/114; 349/146; 359/529; 359/530
(58) Field of Search ................................ 349/113, 114, 349/146; 359/529, 530, 247

(56) References Cited

U.S. PATENT DOCUMENTS

| | | | |
|---|---|---|---|
| 3,905,682 A | | 9/1975 | Meyerhofer |
| 5,182,663 A | * | 1/1993 | Jones ........................... 349/113 |
| 6,067,134 A | | 5/2000 | Akiyama et al. |
| 6,341,002 B1 | * | 1/2002 | Shimizu et al. .............. 349/119 |
| 6,618,107 B1 | * | 9/2003 | Tanaka et al. ............... 349/106 |
| 2001/0040717 A1 | | 11/2001 | Minoura et al. |
| 2002/0149721 A1 | * | 10/2002 | Minoura et al. ............. 349/113 |
| 2002/0154408 A1 | * | 10/2002 | Minoura et al. ............. 359/529 |
| 2003/0124849 A1 | * | 7/2003 | Ihara et al. .................. 438/689 |

FOREIGN PATENT DOCUMENTS

| | | |
|---|---|---|
| JP | 54-105998 A | 8/1979 |
| JP | 3-186816 A | 8/1991 |
| JP | 7-205322 A | 8/1995 |
| JP | 8-321483 A | 12/1996 |
| JP | 9-076245 | 3/1997 |
| JP | 10-260427 | 9/1998 |
| JP | 11-007008 A | 1/1999 |
| JP | 2000-19490 A | 1/2000 |
| JP | 2000-221497 | 8/2000 |
| WO | 98/57212 | 12/1998 |

OTHER PUBLICATIONS

Hasimoto, K et al; "Invited Paper: Reflective Color Display Using Cholesteric Liquid Crystals"; SID International Symposium Digest of Technical Papers; May 1998; pp. 897–900; ISSN0098–966X.

(List continued on next page.)

Primary Examiner—Mike Qi
(74) Attorney, Agent, or Firm—Nixon & Vanderhye P.C.

(57) ABSTRACT

A display device includes a light modulating medium layer, a corner cube array and a reflective electrode layer. The corner cube array is provided on one side of the light modulating medium layer and includes multiple corner cubes as its unit elements. The reflective electrode layer is provided on the corner cube array and includes multiple reflective electrodes that are spaced apart from each other and that are used to apply a voltage to the light modulating medium layer. When the display device is viewed from over the corner cube array, an arrangement pattern of the corner cubes matches an arrangement pattern of the reflective electrodes in at least one direction.

16 Claims, 9 Drawing Sheets

OTHER PUBLICATIONS

"Encyclopedia of the eye, the web vision", Okuzawa, Jul., 1999, pp. 1–22.

Neudeck, G. et al; "Precision Crystal Corner Cube Arrays for Optical Gratings Formed By (100) Silicon Planes With Selective Epitaxial Growth"; Applied Optics, vol. 35, No. 19,. Jul. 1996, pp. 3466–3470.

Kaneko, Control of Atomic Arrangement by Inverse Epitaxy (Semiconductor Atomic Layer Process by On–the–Spot Etching Technique), "Reports of Research and Development Results in 1998 Academic Research Backup Project", Published by Hyogo Science and Technology Association, Nov. 1999 and partial English translation thereof.

U.S. patent application Ser. No. 10/171,651, Minoura et al., filed Jun. 2002.

U.S. patent application Ser. No. 10/315,192, Hara et al., filed Dec. 2002.

* cited by examiner

○ HIGHEST-LEVEL
● LOWEST-LEVEL
△ INTERMEDIATE-LEVEL

*FIG.11*
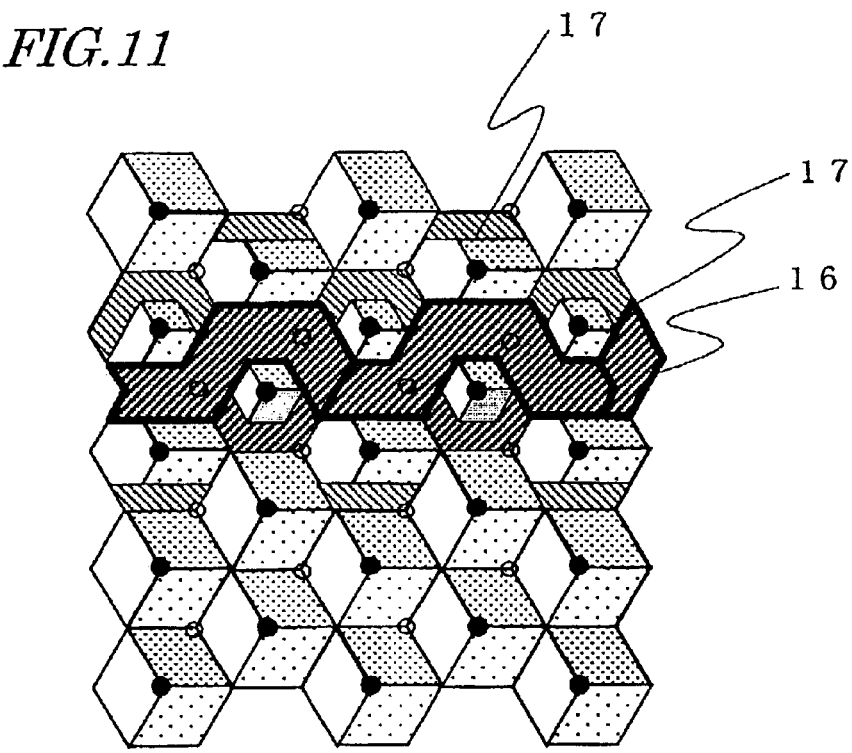
*FIG.12A*  *FIG.12B*  *FIG.12C*
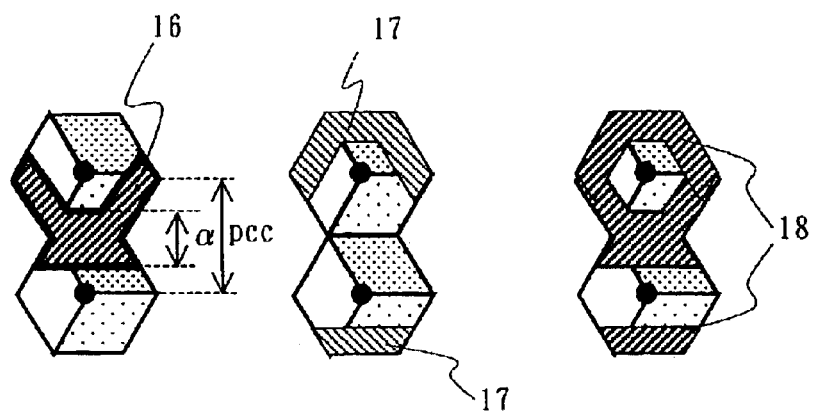

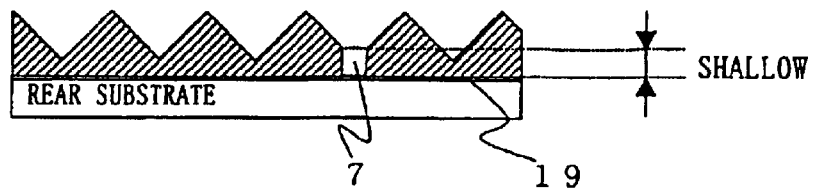
FIG.13A
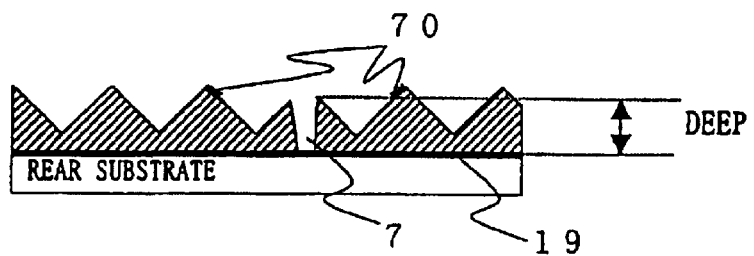
FIG.13B
FIG.14 (Prior Art)
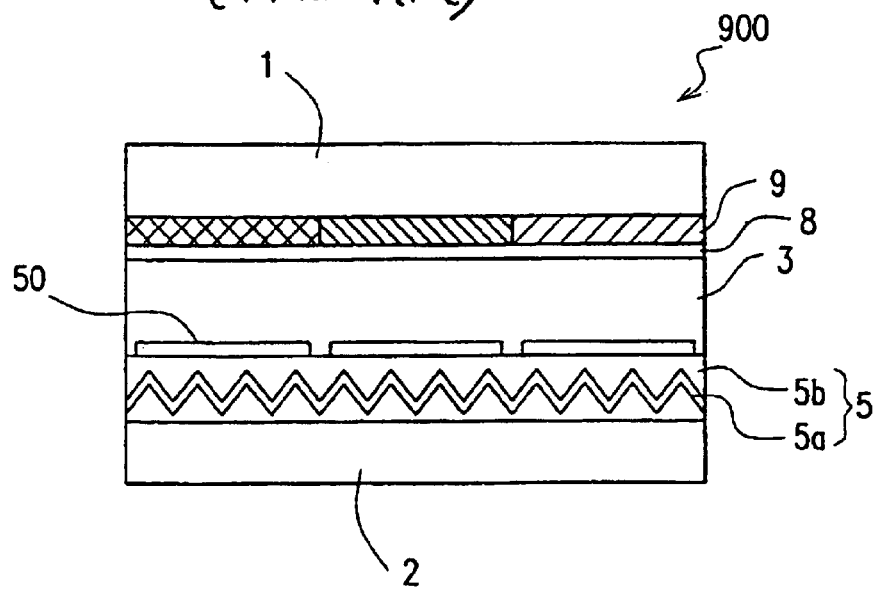

DISPLAY DEVICE INCLUDING CORNER CUBE ARRAY

BACKGROUND OF THE INVENTION

1. Field of the Invention

The present invention relates to a display device including a corner cube array.

2. Description of the Related Art

A reflective liquid crystal display device for conducting a display operation by utilizing ambient light as its light source has been known in the art. Unlike a transmissive liquid crystal display device, the reflective liquid crystal display device needs no backlight, thus saving the power for light source and allowing the user to carry a downsized battery. Also, the space to be left for the backlight in a transmissive device or the weight of the device itself can be saved. For that reason, the reflective liquid crystal display device is not only effectively applicable to various types of mobile electronic units that should be as lightweight and as thin as possible but also allows the use of a battery of an increased size when a unit including the reflective display device is designed to have the same size or weight as a unit including the transmissive device. This is because the space to be left for a backlight in the transmissive device can be used for other purposes in the reflective display device. Thus, the reflective liquid crystal display device is expected to increase the longest operating time of those units by leaps and bounds.

Also, an image displayed by a reflective liquid crystal display device has a better contrast than an image displayed by a display device of any other type even when the display device is used outdoors in the sun. For example, when a CRT, i.e., a self-light-emitting display device, is used outdoors in the sun, the contrast ratio of an image displayed thereon decreases considerably. Likewise, even a transmissive liquid crystal display device, subjected to low reflection treatment, also displays an image at a significantly decreased contrast ratio when the device is operated in an environment in which the ambient light is much intenser than the display light (e.g., in direct sunshine). On the other hand, a reflective liquid crystal display device increases the intensity of the display light proportionally to the quantity of the ambient light, thus avoiding the significant decrease in contrast ratio. For that reason, a reflective liquid crystal display device can be used particularly effectively in mobile electronic units that are often used outdoors, e.g., cell phones, notebook computers, digital cameras and camcorders.

Even though the reflective liquid crystal display devices have these advantageous features that are very useful in various applications, the reflective devices currently available are not fully satisfactory yet in terms of their contrast ratio in dark places, definition, and full-color and moving picture display capabilities, for example. Thus, the development of more practically useful, reflective color liquid crystal display devices is awaited.

A technique of combining a scattering type liquid crystal display mode and a retroreflector is one of known measures to improve the display performance of such a reflective color liquid crystal display device. A conventional reflective liquid crystal display device of such a type will be described with reference to FIG. 14.

As shown in FIG. 14, the reflective liquid crystal display device 900 includes a transparent front substrate 1, including color filters 9 and a counter electrode 8 thereon, and a rear substrate 2, which is disposed so as to face the front substrate 1. A scattering type liquid crystal layer 3, which switches between a scattering state and a transmitting state, is provided between these substrates 1 and 2.

On one surface of the rear substrate 2, thin-film transistors (TFTs, not shown) as switching elements, a retroreflector 5, transparent pixel electrodes 50 and so on are provided so as to face the liquid crystal layer 3. By controlling the voltage to be applied to the liquid crystal layer 3 by way of the TFTs and pixel electrodes 50, each pixel region of the liquid crystal layer 3 can be switched from its scattering state into its transmitting state, or vice versa.

The retroreflector 5 has a reflective film 5a with a predetermined surface shape, which is covered with a planarized layer 5b. The pixel electrodes 50 are provided on the planarized layer 5b. The predetermined surface shape of the reflective film 5a is defined by a great number of unit elements, which are arranged in a regular pattern at a pitch that is smaller than that of the color filters 9. Each of the unit elements is defined by three planes that are opposed substantially perpendicularly to each other. By using the retroreflector 5 having such a configuration, a light ray that has been incident onto this display device 900 can be reflected back toward its source.

Hereinafter, it will be described with reference to FIGS. 15A and 15B how this reflective liquid crystal display device 900 operates. FIGS. 15A and 15B schematically illustrate the black and white display modes of the display device 900.

As shown in FIG. 15A, while the liquid crystal layer 3 is controlled to exhibit the transmitting state, an incoming light ray 54, which has been emitted from an external light source 52, is transmitted through the liquid crystal layer 3 and then reflected back by the retroreflector 5 toward its light source 52 as indicated by the arrow 60. Thus, the light ray 54 that has been emitted from the light source 52 does not reach the eyes of a viewer 56. In such a state, the image reaching the eyes of the viewer 56 from this display device 900 is the image of his or her own eyes. In this manner, the "black" display mode is realized.

On the other hand, while the liquid crystal layer 3 is controlled to exhibit the scattering state, the incoming light ray 54 that has been emitted from the light source 52 is scattered and reflected by the liquid crystal layer 3 as indicated by the arrows 62 in FIG. 15B. That is to say, the retroreflector 5 reflects the incoming light ray 54 not just toward its light source 52 but also toward many other directions. As a result, a portion of the incoming light ray 54 reaches the eyes of the viewer 56. In this manner, the "white" display mode is realized.

Unlike a twisted nematic (TN) mode liquid crystal display device, for example, the reflective liquid crystal display device 900, conducting a display operation under such operating principles, can display the colors black and white without using any polarizer. Using no polarizers, this reflective liquid crystal display device 900 is not affected by a decreased optical efficiency, which is normally unavoidable when polarizers are used, and can display a highly bright image thereon. However, to get a high contrast ratio realized by this reflective liquid crystal display device 900, it is important to maximize the retro-reflectivity of the retroreflector 5 and thereby minimize the amount of unwanted reflected light reaching the viewer's eyes in the black display mode.

A corner cube reflector, which is implemented as an array of corner cubes, is one of known retroreflectors having highest retro-reflectivities. In the corner cube reflector, each of those corner cubes is made up of three planes that are opposed substantially perpendicularly to each other and has a shape corresponding to one corner of a cube. Reflective liquid crystal display devices using a corner cube array of a very small size (which will be herein referred to as a "micro corner cube array (MCCA)") as their retroreflector are disclosed, for example, in U.S. Pat. No. 5,182,663 and Japanese Patent Application No. 2001-090908 that was filed by the applicant of the present application. The MCCA may be formed by the manufacturing processing step of etching the surface of a crystalline substrate anisotropically (see Japanese Patent Application No. 2001-306052 that was also filed by the applicant of the present application).

The conventional reflective liquid crystal display device including the corner cube reflector, however, includes the transparent pixel electrodes 50 and liquid crystal layer 3 that are spaced apart from the reflective film 5a of the retroreflector 5 as shown in FIG. 14. If there is a distance between the liquid crystal layer 3 with a light modulating function and the reflective film 5a in this manner, then a parallax problem may happen to deteriorate the display performance eventually. A display device including a retroreflector 5 normally has a relatively great allowance to a parallax. However, it is naturally expected that an even higher display quality should be achieved if this parallax could be reduced.

Also, in the display device shown in FIG. 14, the rugged surface of the reflective film 5a of the retroreflector 5 is planarized by the planarized layer 5b. In such a configuration, however, the incoming light ray may be either absorbed into the planarized layer 5b or not reflected back as intended (i.e., scattered) from the interface between the planarized layer 5b and the liquid crystal layer 3. As a result, a bright image cannot be displayed or the contrast ratio may decrease.

Furthermore, to get good display performance realized by a reflective liquid crystal display device including such a corner cube reflector, it is even more important than usual to establish an appropriate relationship between the pitch or arrangement pattern of the corner cubes and that of pixels. For example, U.S. Pat. No. 5,182,663 identified above describes that if the pixel pitch is set greater than the pitch of corner cubes, then an incoming light ray that has been incident onto a given pixel region and then retro-reflected by the retroreflector will not pass its adjacent pixel region on the way back and the display performance can be improved as a result. However, in the display device disclosed in U.S. Pat. No. 5,182,663, the transparent pixel electrodes are also provided over the retroreflector, thus causing the parallax and other problems mentioned above.

As described above, none of the conventional reflective liquid crystal display devices including the corner cube reflector has ever achieved sufficiently good display performance by eliminating the parallax, increasing the brightness, and getting the appropriate relationship satisfied between the arrangement patterns of the corner cubes and pixel electrodes.

SUMMARY OF THE INVENTION

In order to overcome the problems described above, preferred embodiments of the present invention provide a display device that realizes even higher display quality by using a corner cube array as a retroreflector.

A display device according to a preferred embodiment of the present invention preferably includes a light modulating medium layer, a corner cube array, and a reflective electrode layer. The corner cube array is preferably provided on one side of the light modulating medium layer and preferably includes multiple corner cubes as its unit elements. The reflective electrode layer is preferably provided on the corner cube array and preferably includes multiple reflective electrodes that are spaced apart from each other and that are used to apply a voltage to the light modulating medium layer. When the display device is viewed from over the corner cube array, an arrangement pattern of the corner cubes preferably matches an arrangement pattern of the reflective electrodes in at least one direction.

In one preferred embodiment of the present invention, the corner cube array preferably includes multiple surrounding corner cubes that are adjacent to edges of the reflective electrodes. Each of the multiple surrounding corner cubes is preferably either a corner cube that is partially overlapped by the edge of associated one of the reflective electrodes or a corner cube that is in contact with the edge of the associated reflective electrode. The reflective electrodes preferably do not cover the lowest-level points of the surrounding corner cubes.

A display device according to another preferred embodiment of the present invention also preferably includes a light modulating medium layer, a corner cube array, and a reflective electrode layer. The corner cube array is preferably provided on one side of the light modulating medium layer and preferably includes multiple corner cubes as its unit elements. The reflective electrode layer is preferably provided on the corner cube array and preferably includes multiple reflective electrodes that are spaced apart from each other and that are used to apply a voltage to the light modulating medium layer. The reflective electrode layer preferably includes a non-reflecting region, which is located between adjacent ones of the reflective electrodes. The corner cube array preferably includes multiple surrounding corner cubes that are adjacent to edges of the reflective electrodes. Each of the surrounding corner cubes is preferably either a corner cube that is overlapped by both associated one of the reflective electrodes and the non-reflecting region or a corner cube that is in contact with the edge of the associated reflective electrode. Each said surrounding corner cube is preferably adjacent to another one of the corner cubes under the associated reflective electrode. The boundary between the former and latter corner cubes preferably includes highest-level points of the two corner cubes. The boundary between the associated reflective electrode and the non-reflecting region is preferably either more distant from the center of the reflective electrode than the highest-level points are or as distant from the center of the reflective electrode as the highest-level points are.

A display device according to still another preferred embodiment of the present invention also preferably includes a light modulating medium layer, a corner cube array, and a reflective electrode layer. The corner cube array is preferably provided on one side of the light modulating medium layer and preferably includes multiple corner cubes as its unit elements. The reflective electrode layer is preferably provided on the corner cube array and preferably includes multiple reflective electrodes that are spaced apart from each other and that are used to apply a voltage to the light modulating medium layer. The reflective electrode layer preferably includes a non-reflecting region, which is located between adjacent ones of the reflective electrodes. The corner cube array preferably includes multiple surrounding corner cubes that are adjacent to edges of the reflective electrodes. Each of the surrounding corner cubes is preferably either a corner cube that is overlapped by both associated one of the reflective electrodes and the non-reflecting region or a corner cube that is in contact with the edge of the associated reflective electrode. Each said surrounding corner cube is preferably adjacent to another one of the corner cubes under the associated reflective electrode. The boundary between the former and latter corner cubes preferably includes highest-level points of the two corner cubes. The highest-level points are preferably not overlapped by the non-reflecting region.

In one preferred embodiment of the present invention, the non-reflecting region preferably extends along a line that connects together the lowest-level points of adjacent ones of the surrounding corner cubes.

In this particular preferred embodiment, the non-reflecting region preferably has a minimum width that is smaller than the width of a contact portion between two adjacent ones of the surrounding corner cubes.

More specifically, the minimum width of the non-reflecting region is preferably at most $1/\sqrt{3}$ of a pitch $P_{cc}$ of corner cubes as measured along the line that connects together the lowest-level points of the surrounding corner cubes.

In still another preferred embodiment, $\alpha/P_{cc} > 2-\sqrt{10}/2$ is preferably satisfied, where $P_{cc}$ is a pitch of corner cubes as measured along the line that connects together the lowest-level points of the surrounding corner cubes and $\alpha$ is the minimum width of the non-reflecting region.

A display device according to yet another preferred embodiment of the present invention also preferably includes a light modulating medium layer, a corner cube array, and a reflective electrode layer. The corner cube array is preferably provided on one side of the light modulating medium layer and preferably includes multiple corner cubes as its unit elements. The reflective electrode layer is preferably provided on the corner cube array and preferably includes multiple reflective electrodes that are spaced apart from each other via a non-reflecting region and that are used to apply a voltage to the light modulating medium layer. The non-reflecting region is preferably located between adjacent ones of the reflective electrodes. $\alpha/P_{cc} < 2-\sqrt{10}/2$ is preferably satisfied, where $P_{cc}$ is a pitch of corner cubes as measured along a line that connects together the lowest-level points of the corner cubes and $\alpha$ is the minimum width of the non-reflecting region. The non-reflecting region preferably extends along edges of consecutive ones of the corner cubes. The edges of the consecutive corner cubes preferably define a boundary between the consecutive corner cubes.

In one preferred embodiment of the present invention, the centerline of the non-reflecting region that extends along the edges is preferably substantially aligned with the boundary between the consecutive corner cubes.

In another preferred embodiment of the present invention, the display device preferably further includes electrodes, which are provided on the corner cube array so as to be opposed to the reflector electrode layer and which are electrically connected to the reflective electrodes by way of contact holes. The contact holes are preferably provided through concave portions of the corner cube array.

In still another preferred embodiment, the light modulating medium layer is preferably a liquid crystal layer that exhibits a scattering state and a transmitting state.

In yet another preferred embodiment, the reflective planes of the reflective electrodes are preferably substantially parallel to the surfaces of the corner cubes.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 11 is a plan view illustrating an electrode arrangement pattern according to a second specific preferred embodiment of the present invention.

FIGS. 12A, 12B and 12C show the principle of non-retro-reflection according to the second preferred embodiment.

FIG. 13A is a cross-sectional view illustrating a configuration for a display device according to a third specific preferred embodiment of the present invention.

FIG. 13B is a cross-sectional view illustrating a configuration for a display device as a comparative example.

FIG. 14 is a cross-sectional view illustrating a conventional display device.

DETAILED DESCRIPTION OF PREFERRED EMBODIMENTS

Figure 1A:
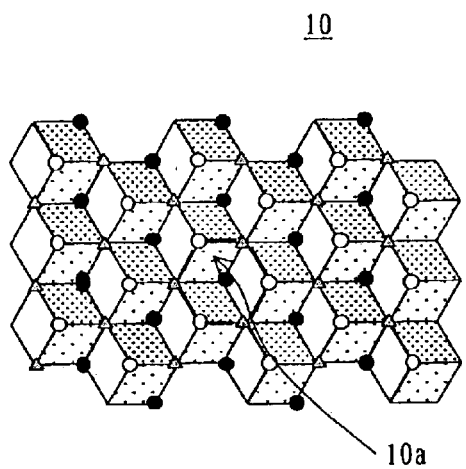
FIGS. 1A and 1B are respectively a plan view and a perspective view illustrating a corner cube array for use in a display device according to a preferred embodiment of the present invention.
Figure 1B:
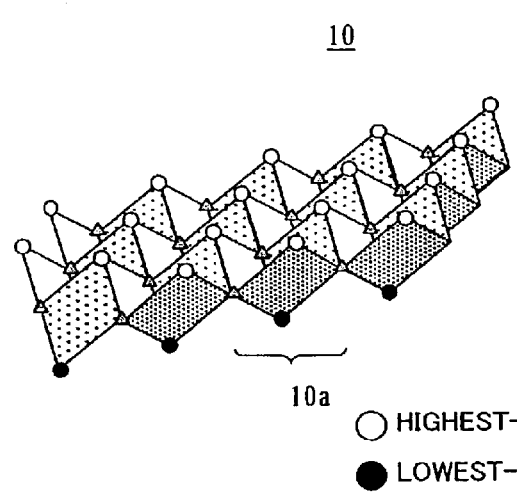

First, the operating principle of a display device according to a preferred embodiment of the present invention will be described with reference to FIGS. 1A through 4. In a display device according to a preferred embodiment of the present invention, a reflective electrode layer 14, including multiple reflective electrodes 12 that are horizontally spaced apart from each other, is provided on a corner cube array 10 as shown in FIG. 4. The corner cube array 10 and the reflective electrode layer 14 together make up a corner cube reflector 20 as a retroreflector. FIGS. 1A and 1B are respectively a plan view and a perspective view of the corner cube array 10.

Unlike the conventional display device 900 including the retroreflector shown in FIG. 14, such a display device 100 provides no distance between the light modulating medium layer (or light modulating layer) such as a liquid crystal layer and the reflective surfaces of the retroreflector, thus producing no parallax. As a result, the display performance can be improved. Also, since the rugged surfaces of the corner cube reflector 20 are not covered with any transparent planarized layer, no light is either absorbed into, or reflected from, any transparent planarized layer. Thus, the display performance can be further improved.

However, in a display device including such a corner cube reflector that is obtained by providing reflective electrodes on a corner cube array, it is very important to determine the sizes and arrangement pattern of the reflective electrodes appropriately. This is because each of those reflective electrodes defines not only a specific portion of the light modulating medium layer that contributes to the display of its associated pixel (i.e., pixel region) but also a specific region of the corner cube reflector that can reflect an incoming light ray back to its source. Hereinafter, this point will be described in detail.

Figure 2:
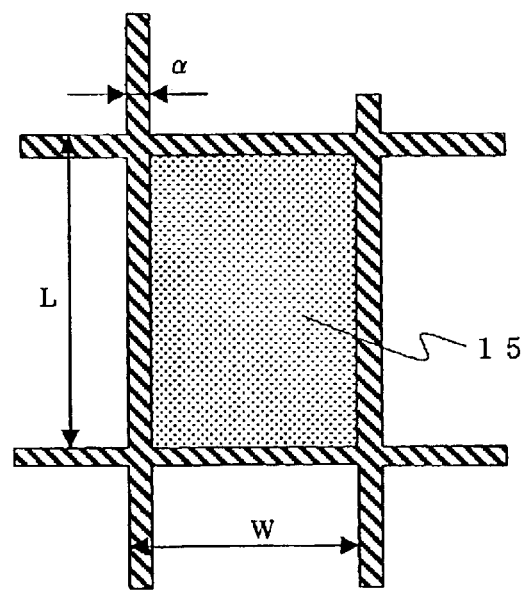
FIG. 2 shows what the "aperture ratio" is.

Generally speaking, a display device needs to maximize its aperture ratio AR to display as bright an image as possible. The "aperture ratio" is the ratio of a total area of effective pixel regions (i.e., the sum of the areas of respective portions of pixels contributing to display) to the overall display area. As shown in FIG. 2, the aperture ratio AR may be given by $$AR=(L-\alpha)\times(W-\alpha)/\text{pixel area}(=L\times W) \quad (1)$$

where L is the length ($\mu$m) of a pixel, W is the width ($\mu$m) of the pixel, and a is the width ($\mu$m) of a gap between pixel electrodes (which will be herein referred to as an "inter-electrode gap" or "inter-pixel region"). The area of one pixel is represented in $\mu m^2$.

In Equation (1), $(L-\alpha)\times(W-\alpha)$ represents the area of one effective pixel region 15, which typically corresponds to the area of one pixel electrode. The greater the area of the effective pixel region 15, the higher the aperture ratio AR. Accordingly, to realize a display device with an aperture ratio AR that is high enough to display a bright image, the width a of the inter-electrode gap is preferably minimized.

However, in the display device 100 including the corner cube reflector 20 shown in FIG. 4, even if the width a of the inter-electrode gap 16 is minimized, the retro-reflectivity of the corner cube reflector 20 is still changeable with the specific location of the gap 16 on the corner cubes. That is to say, the display performance of such a display device 100 cannot always be optimized just by minimizing the gap width $\alpha$.

Figure 3A:
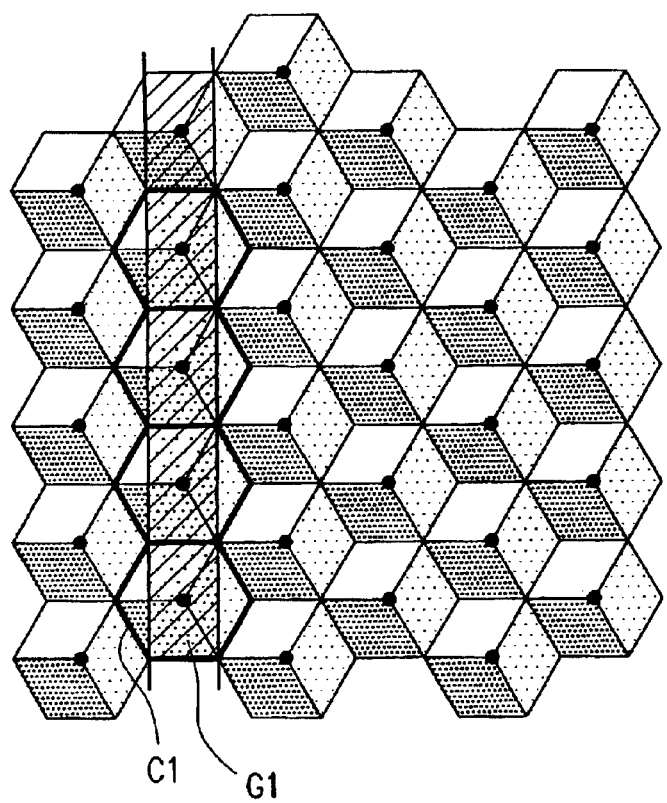
FIGS. 3A and 3B show how the retro-reflectivity changes with the location of an inter-electrode gap.
Figure 3B:
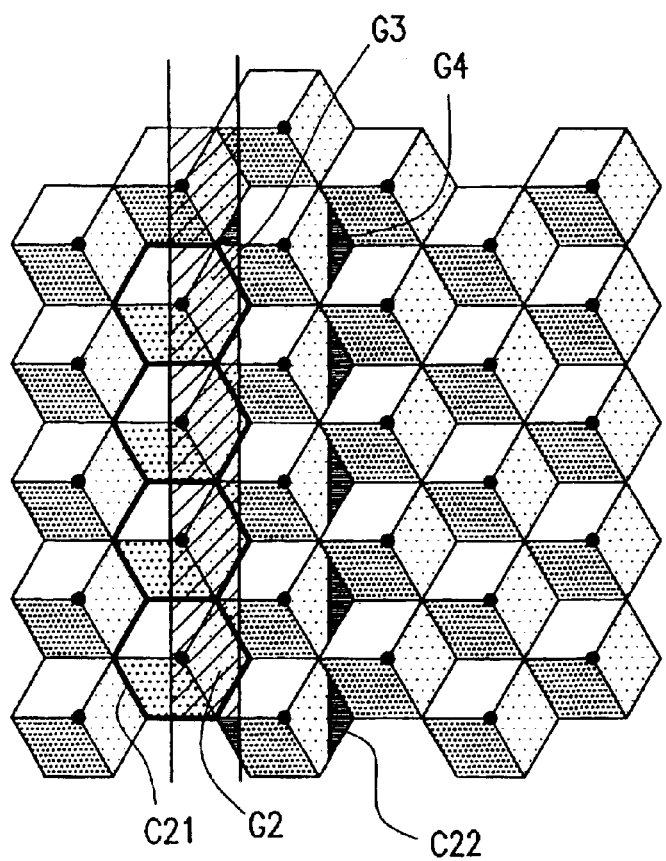
Figure 4:
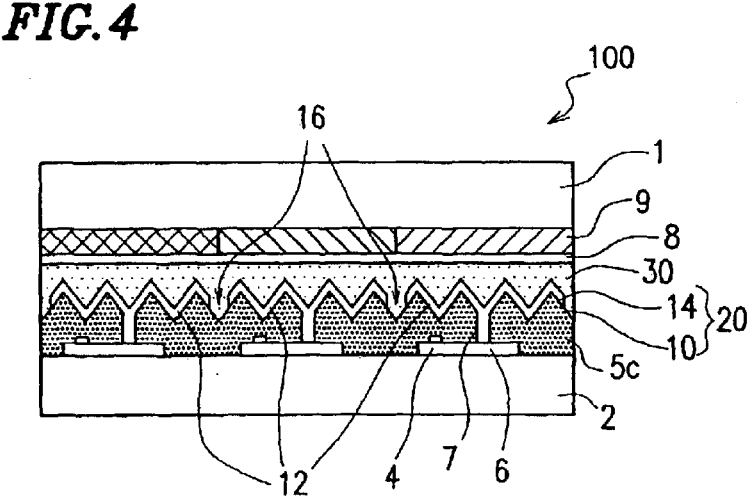
FIG. 4 is a cross-sectional view illustrating a display device according to a first specific preferred embodiment of the present invention.

FIGS. 3A and 3B show two situations where the inter-electrode (or inter-pixel) gaps G1 and G2 (i.e., non-reflecting regions) of the same width are located over mutually different portions of the same row of corner cubes. In FIGS. 3A and 3B, the lowest-level point of each corner cube is indicated by the solid circle ●.

In the situation shown in FIG. 3A, the gap G1 runs vertically through one row of corner cubes C1. In that case, the non-retro-reflecting portions have the maximum area but are located inside the same row of corner cubes C1.

Normally, a light ray that has been incident onto a corner cube is reflected back to its source after having been reflected by each of its three substantially perpendicularly opposed planes. Accordingly, the non-retro-reflecting portions of corner cubes include not only portions of the corner cubes that cannot reflect the incoming light ray at all (which will be herein referred to as "non-reflecting portions") but also other portions thereof that reflect the light ray toward those non-reflecting portions (i.e., portions that are located symmetrically to the non-reflecting portions). For that reason, the total area of those non-retro-reflecting portions of corner cubes is normally greater than that of the non-reflecting portions thereof.

On the other hand, in the situation shown in FIG. 3B, the inter-electrode (or inter-pixel) gap G2 runs vertically over two rows of corner cubes C21 and C22. In that case, more than half of one row of corner cubes C21 is overlapped by the gap G2, and the corner cubes C21 on the row are all non-retro-reflecting. In the other row of corner cubes C22, non-reflecting portions G3 and their symmetrical portions G4 are non-retro-reflecting. Accordingly, although these gaps G1 and G2 have the same width, the total area of the non-retro-reflecting portions in the situation shown in FIG. 3B is greater than the situation shown in FIG. 3A. Thus, the retro-reflectivity decreases if the inter-electrode gap G2 is provided at the location shown in FIG. 3B.

As described above, when a retroreflector, obtained by providing reflective electrodes on a corner cube array, is used, the retro-reflectivity of the retroreflector changes in accordance with the relationship between the size or arrangement pattern of the corner cubes and the size or arrangement pattern of the reflective electrodes (or inter-electrode gaps). That is to say, to improve the display performance of such a display device, these relationships need to be defined appropriately in such a manner as to achieve the desired retro-reflectivity. A problem like this does not come up with the conventional display device 900 in which the transparent pixel electrodes 50 are spaced from the retroreflector 5 as shown in FIG. 14.

In view of these considerations, the present inventors discovered appropriate conditions for the arrangement pattern of reflective electrodes to be provided on the corner cube array to obtain a display device with improved display performance.

Hereinafter, specific preferred embodiments of a reflective liquid crystal display device according to the present invention will be described.

Embodiment 1

FIG. 4 illustrates a configuration for a reflective liquid crystal display device according to a first specific preferred embodiment of the present invention. As shown in FIG. 4, the reflective liquid crystal display device 100 includes a transparent front substrate 1, including color filters 9 and a transparent counter electrode 8 thereon, and a rear substrate 2, which is disposed so as to face the front substrate 1. A scattering type liquid crystal layer 30, which switches between a scattering state and a transmitting state, is provided as a light modulating medium layer between these substrates 1 and 2. On one surface of the rear substrate 2, thin-film transistors (TFTs) 4 as switching elements, an interlevel dielectric film 5c of which the surface defines a corner cube array 10, and a reflective electrode layer 14 including multiple reflective electrodes 12 to apply a voltage to the liquid crystal layer 30 are provided so as to face the liquid crystal layer 30.

The reflective electrodes 12, which are horizontally spaced apart from each other, are made of a metal material such as Al, Ag or an alloy thereof. For example, when the reflective electrodes 12 are made of Al, the reflective electrode layer 14 is deposited to a thickness of about 100 nm on the interlevel dielectric film 5c. On the other hand, when the reflective electrodes 12 are made of Ag, the reflective electrode layer 14 is deposited to a thickness of about 150 nm to about 200 nm on the interlevel dielectric film 5c. Each of these reflective electrodes 12 can reflect a light ray that has been incident onto the liquid crystal layer 30 through the front substrate 1. In this preferred embodiment, there is only a slight difference in refractive index between the interlevel dielectric film 5c and the liquid crystal layer 30 and the incoming light ray is hardly reflected from the interface between the interlevel dielectric film 5c and the liquid crystal layer 30 due to the difference in refractive index. Accordingly, the gaps 16 between the reflective electrodes 12 define a non-reflecting region.

Also, each of these reflective electrodes 12 is electrically connected to the drain electrode 6 of its associated TFT 4 by way of a contact hole 7, which is provided through the interlevel dielectric film 5c. By controlling a voltage to be applied to the liquid crystal layer 30 from each of the reflective electrodes 12 (and the transparent counter electrode 8), the liquid crystal layer 30 can be switched from its scattering state into its transmitting state, or vice versa, on a pixel-by-pixel basis.

The scattering type liquid crystal layer 30 may be made of a polymer-dispersed liquid crystal material, a nematic-cholesteric phase change type liquid crystal material or a liquid crystal gel. Furthermore, the liquid crystal layer 30 may also be made of any of various other liquid crystal materials as long as the material allows the liquid crystal layer 30 to switch between a mode to transmit the incoming light and a mode to scatter the incoming light at least. Specifically, examples of other usable liquid crystal materials include: a cholesteric liquid crystal material, which can switch between transmitting and reflecting states and to which diffusion properties are imparted by controlling the domain sizes of liquid crystal molecules; and a polymer-dispersed liquid crystal material with a holographic function, which switches between transmitting and reflecting states and to which diffusion properties are imparted by exposing the material to diffusing radiation.

The surface of the interlevel dielectric film 5c, on which the reflective electrodes 12 are provided, defines the array 10 of corner cubes (or unit elements) 10a shown in FIGS. 1A and 1B. Each of these corner cubes 10a has a concave shape that consists of three almost square planes that are opposed substantially perpendicularly to each other. The reflective electrode layer 14 is provided on the corner cube array 10 such that the reflective planes (i.e., the respective surfaces of the reflective electrodes 12) are substantially parallel to the respective surfaces of the corner cube array 10. In this manner, a corner cube reflector 20 is obtained. The corner cube reflector 20 can reflect back an incoming light ray, which has been incident onto the corner cube reflector 20 by way of the liquid crystal layer 30, substantially right toward its light source.

Such a corner cube array 10 may be formed by performing the processing step of etching the surface of a single crystalline substrate anisotropically as disclosed by the applicant of the present application in Japanese Patent Application No. 2001-306052. According to such a method, an array of corner cubes of as small a size as about 100 µm or less can be formed with very high shape precision.

The reflective liquid crystal display device 100 of this preferred embodiment displays an image thereon just like the conventional reflective liquid crystal display device 900 shown in FIG. 14. That is to say, when the liquid crystal layer 30 is switched into the transparent (or transmitting) state by controlling appropriately the voltage to be applied from the reflective electrodes 12 and the transparent counter electrode 8 to the liquid crystal layer 30, the incoming light ray can be reflected back toward its source just as intended and the desired black display mode is realized. On the other hand, when the liquid crystal layer 30 is switched into the scattering state by controlling appropriately the voltage to be applied from the reflective electrodes 12 and the transparent counter electrode 8 to the liquid crystal layer 30, the incoming light ray is scattered by the liquid crystal layer 30 and the desired white display mode is realized. This liquid crystal display device 100 uses no polarizers and can display a bright image thereon.

In the reflective liquid crystal display device 100 of this preferred embodiment, the scattering type liquid crystal layer 30 is in contact with the reflective planes of the corner cube reflector 20 and no planarized layer is provided on the reflective planes. Thus, no light is absorbed into, or non-retro-reflected from, any planarized layer. Thus, a bright image can be displayed at a high contrast ratio. Also, since there is no significant distance between the reflective electrodes 12 and the liquid crystal layer 30, no parallax can be produced. It should be noted that the liquid crystal layer 30 does not have to be in contact with the reflective electrodes 12. If necessary, an alignment film (not shown) may be provided over the reflective electrodes 12 to control the orientation directions of liquid crystal molecules in the liquid crystal layer 30.

Hereinafter, the relationship between the arrangement pattern of the corner cubes 10a and that of the reflective electrodes 12 in this liquid crystal display device 100 will be described.

In this preferred embodiment, when the display device 100 is viewed from over the corner cube array 10 (i.e., on a display plane, or a plane that is parallel to the principal surface of the rear substrate 2), the arrangement pattern of the corner cubes 10a matches that of the reflective electrodes 12 in at least one direction. As used herein, the "matching state" between the arrangement patterns of the corner cubes and reflective electrodes is typically found in the following situations.

Specifically, suppose the reflective electrodes to be provided for respective pixels (i.e., pixel electrodes) are arranged in a regular pattern (typically in columns and rows). In that case, the pitch of the reflective electrodes (i.e., the sum of the length of each reflective electrode and the width of the gap between two adjacent reflective electrodes) is preferably an integral number of times as long as the pitch of corner cubes in at least one of the directions in which the reflective electrodes are arranged. Also, supposing multiple groups of reflective electrodes (each of which groups may consist of a R (red) pixel electrode, a G (green) pixel electrode and a B (blue) pixel electrode, for example) are arranged in a regular pattern, the pitch of these groups of pixel electrodes is preferably an integral number of times as long as the pitch of corner cubes.

Figure 5:
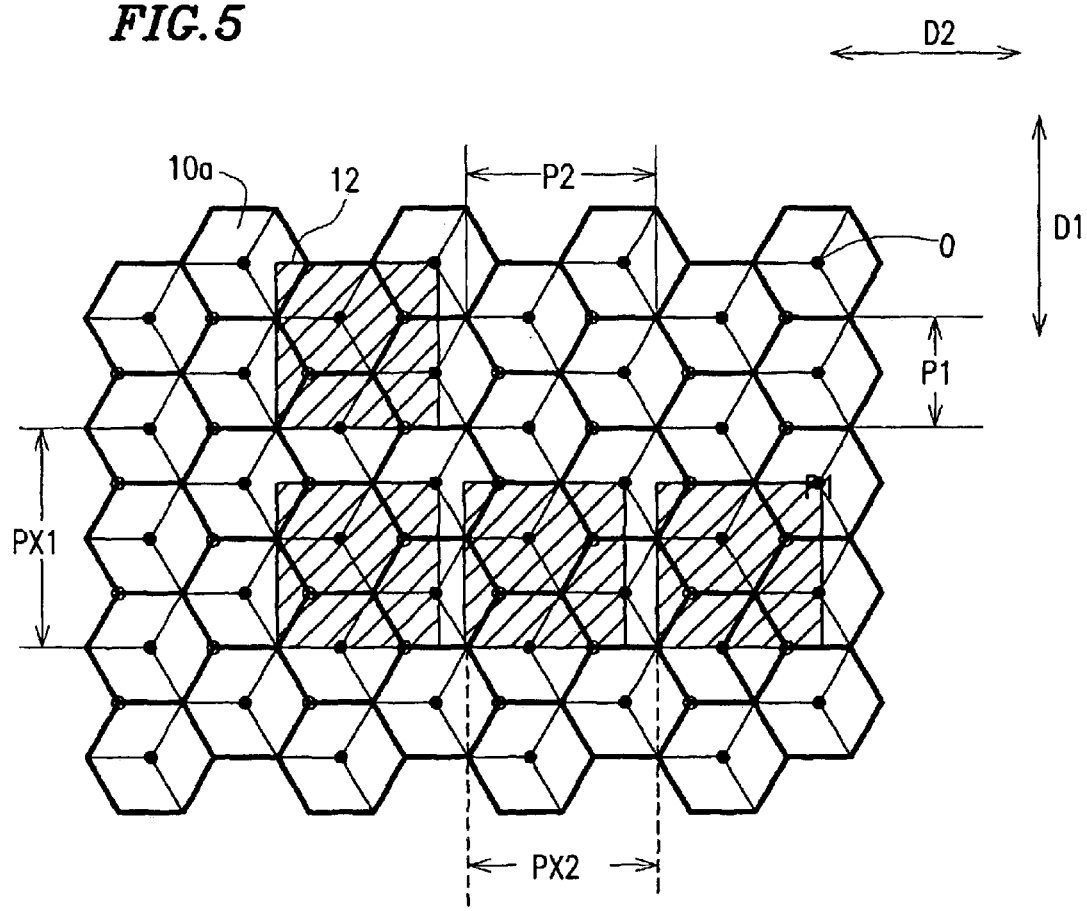
FIG. 5 is a plan view illustrating an electrode arrangement pattern according to the first preferred embodiment.

As shown in FIG. 5, the arrangement pitches of the corner cubes 10a are typically defined separately as a pitch P1 in a first direction D1, in which the centers (i.e., the lowest-level points) O of respective corner cubes 10a are arranged in line, and as a pitch P2 in a second direction D2 that is vertical to the first direction D1. Also, if the reflective electrodes 12 are arranged in columns and rows in the first and second directions D1 and D2, the pitches of the reflective electrodes 12 in these directions D1 and D2 may also be separately defined as pitches PX1 and PX2, respectively. In that case, the pitch PX1 is preferably an integral number of times as long as the pitch P1 and/or the pitch PX2 is preferably an integral number of times as long as the pitch P2 in this preferred embodiment. It should be noted that the "pitch" of the arrangement pattern of the reflective electrodes 12 or corner cubes 10a in a predetermined direction herein means a length corresponding to the shortest period of the periodic pattern of the reflective electrodes 12a or corner cubes 10a in the predetermined direction. In the example illustrated in FIG. 5, the arrangement pitches of the reflective electrodes 12 are 1 or 2 times as long as those of the corner cubes 10a for the sake of simplicity. Actually, though, the arrangement pitches of the reflective electrodes 12 are preferably at least twice as long as those of the corner cubes 10a.

When the arrangement pattern of the corner cubes 10a matches that of the reflective electrodes 12 in this manner, the pattern of a group of corner cubes 10a that are covered with one reflective electrode 12 may be the same as that of another group of corner cubes 10a that are covered with another reflective electrode 12 as shown in FIG. 5. Then, the respective reflective electrodes 12 will have substantially the same retro-reflectivity. Consequently, the display performance (e.g., the contrast ratio) can be uniform over the entire screen and an image of quality can be displayed.

Next, it will be described where the non-reflecting region to be provided between two adjacent reflective electrodes (i.e., inter-pixel region) should be located. In this preferred embodiment, the width of the non-reflecting region (i.e., inter-pixel gap width) is supposed to be 1 to 2 times as long as the pitch of corner cubes.

Figure 6:
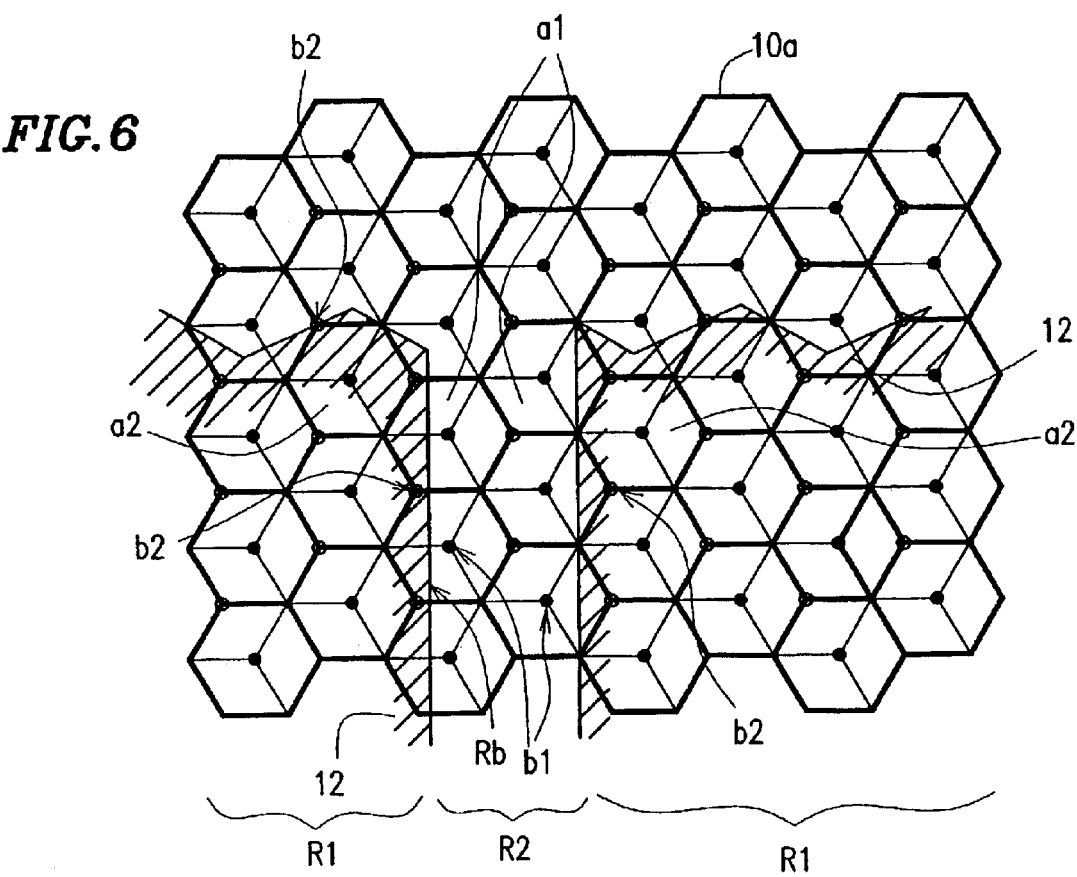
FIG. 6 is a plan view illustrating another electrode arrangement pattern according to the first preferred embodiment.

FIG. 6 shows portions of the edges (or peripheries) of two adjacent reflective electrodes 12 on a larger scale. As shown in FIG. 6, a non-reflecting region (i.e., a region in which no reflective electrodes 12 are present) R2 is provided between two reflecting regions R1 that are defined by these two reflective electrodes 12.

As can be seen from FIG. 6, the edges Rb of each reflecting region R1 (i.e., the boundary between the reflecting region R1 and the non-reflecting region R2) are closer to the center of the reflective electrode 12 than the lowest-level points ● of its surrounding corner cubes a1 are. In other words, the lowest-level points b1 of the surrounding corner cubes a1, which are overlapped by the edges Rb of the reflecting regions R1, are not located inside the reflecting regions R1 but inside the non-reflecting region R2.

Figure 7:
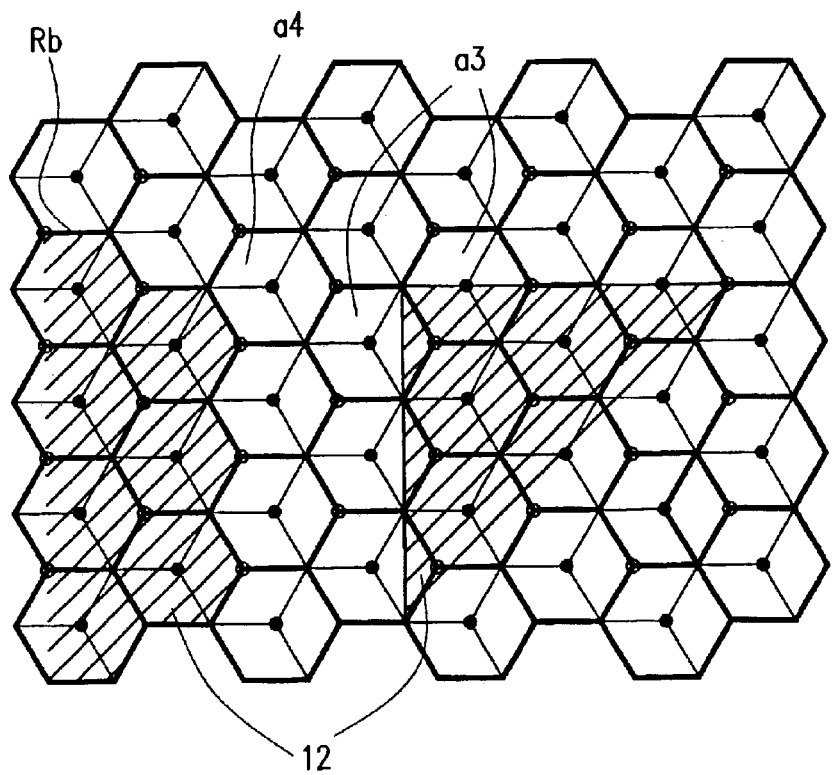
FIG. 7 is a plan view illustrating surrounding corner cubes.

As used herein, the "surrounding corner cubes" a1 are corner cubes that are adjacent to the edges Rb of the reflective electrodes 12. As shown in FIG. 7, the surrounding corner cubes a1 include corner cubes a3, each of which is overlapped by both the reflective electrode 12 (i.e., the reflecting region R1) and the non-reflecting region R2, and/or corner cubes a4, each of which is in contact with the edge Rb of the reflective electrode 12.

Referring back to FIG. 6, the boundary Rb between the non-reflecting region R2 and the reflective electrode 12 is more distant from the center of the reflective electrode 12 than the highest-level points b2 of the surrounding corner cubes a1 and other corner cubes a2 that are adjacent to the surrounding corner cubes a1 under the reflective electrode 12.

If the boundary Rb between the non-reflecting region R2 and the reflective electrode 12 is provided at such a location, then the predetermined gap can be provided between the reflective electrodes 12 and the total area of retro-reflecting portions of the corner cube reflector can be maximized. For example, suppose the width of the non-reflecting region R2 shown in FIG. 6 is the minimum allowable width that is determined by various constraints to be imposed on the actual manufacturing process. In that case, if the boundary Rb is defined as shown in FIG. 6, the non-retro-reflecting region between the reflective electrodes is located over just two rows of corner cubes, most of which is non-reflecting.

Suppose the locations of the reflective electrodes 12 are slightly shifted leftward from those shown in FIG. 6 with respect to the arrangement pattern of the corner cubes. For example, suppose the boundary Rb of the reflective electrode 12 on the left-hand side has been shifted horizontally leftward by a predetermined distance with respect to the highest-level points b2. In that case, the non-retro-reflecting region will be located over not just the two rows of corner cubes but also portions of other corner cubes as well. Thus, it can be seen that to obtain a corner cube reflector with a high retro-reflectivity, the location of the boundary Rb should be defined appropriately with respect to the arrangement pattern of the corner cubes.

Next, a situation where the non-reflecting region R2 has a narrower width will be described with reference to FIG. 8.

Figure 8:
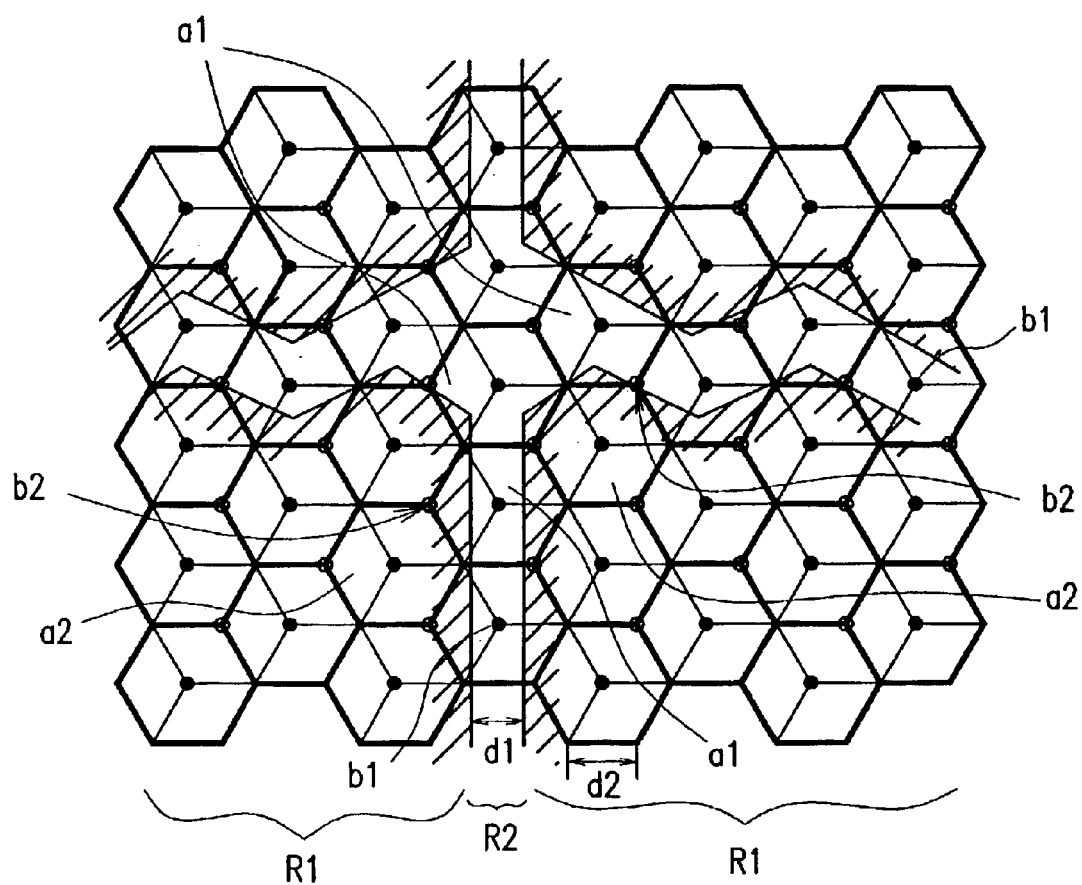
FIG. 8 is a plan view illustrating still another electrode arrangement pattern according to the first preferred embodiment.

In the preferred embodiment shown in FIG. 8, the non-reflecting region R2 is provided between adjacent reflective electrodes 12 so as not to overlap the highest-level points b2 of the surrounding corner cubes a1 and corner cubes a2 that are adjacent to the corner cubes a1 under the reflective electrodes 12. For that purpose, the non-reflecting region R2 has a width d1, which is smaller than the width d2 of a contact portion between two adjacent corner cubes, and extends along a line that connects together the lowest-level points b1 of a series of adjacent corner cubes a1.

If the non-reflecting region R2 is provided so as to extend along the series of lowest-level points b1 of the corner cubes a1 and not to overlap the highest-level points b2 of the corner cubes a2 in this manner, then the total area of the non-retro-reflecting portions can be reduced. That is to say, the non-reflecting region R2 does not overlap the highest-level points b2 between the corner cubes a1 and a2. Accordingly, the corner cubes a2, which are adjacent to the corner cubes a1 that are mostly non-reflecting, have no portions that are symmetric to the non-reflecting region R2 and therefore have no non-retro-reflecting portions. Thus, it is only the corner cubes a1 overlapped by the non-reflecting region R2 that are non-retro-reflecting. As a result, the overall retro-reflectivity of the corner cube reflector can be increased.

It should be noted that to get just one row of corner cubes a1 overlapped by the non-reflecting region R2 in this manner, the minimum width d1 of the non-reflecting region R2 should be smaller than the width d2 of a contact portion between the surrounding corner cubes a1. This minimum width d1 may be defined by the pitch $P_{cc}$ of the corner cubes a1 in a direction in which the centers (i.e., the lowest-level points b1) of the corner cubes a1 are arranged in line.

Figure 9:
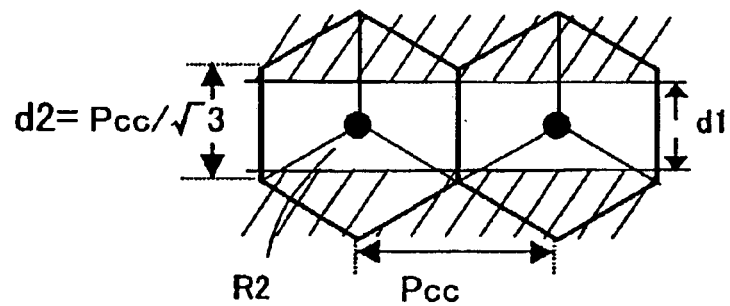
FIG. 9 shows a relationship between the pitch of corner cubes and the width of an inter-electrode gap.

FIG. 9 shows the pitch $P_{cc}$ of the corner cubes a1 and the width d2 of the contact portion between the corner cubes a1. As can be seen from FIG. 9, the corner cubes have a rectangular hexagonal shape and the width d2 of the contact portion between the adjacent corner cubes is $1/\sqrt{3}$ times as long as the pitch $P_{cc}$. Thus, it can be seen that the minimum width d1 of the non-reflecting region R2 needs to be smaller than $P_{cc}/\sqrt{3}$.

In this manner, by selecting an appropriate arrangement pattern for the reflective electrodes to be provided on the corner cube array, the retro-reflectivity of each pixel region can be increased. As a result, an image can be displayed at a higher contrast ratio.

Figure 10:
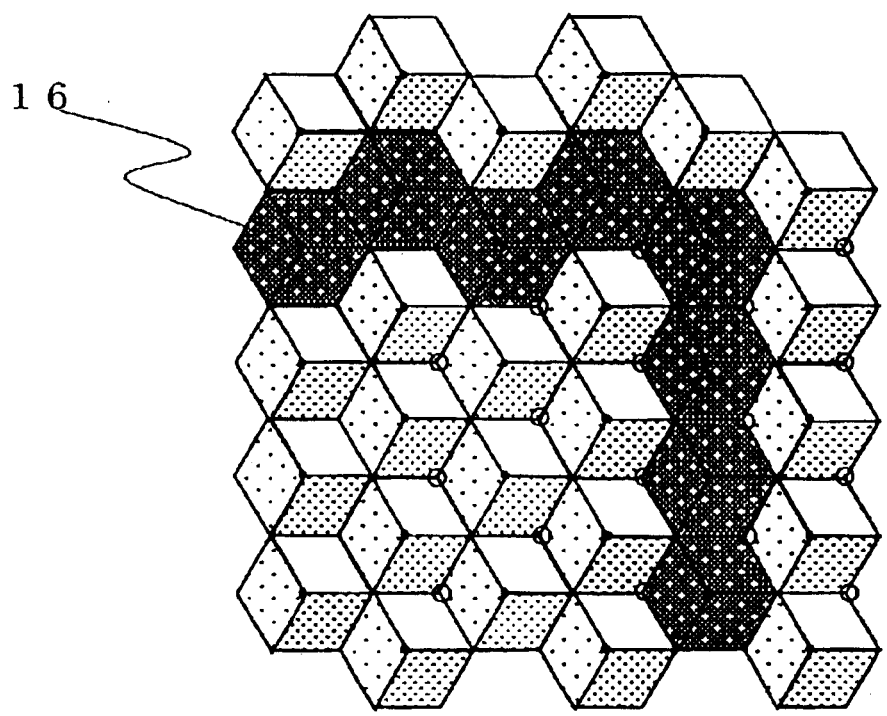
FIG. 10 is a plan view illustrating yet another electrode arrangement pattern according to the first preferred embodiment.
Figure 15A:
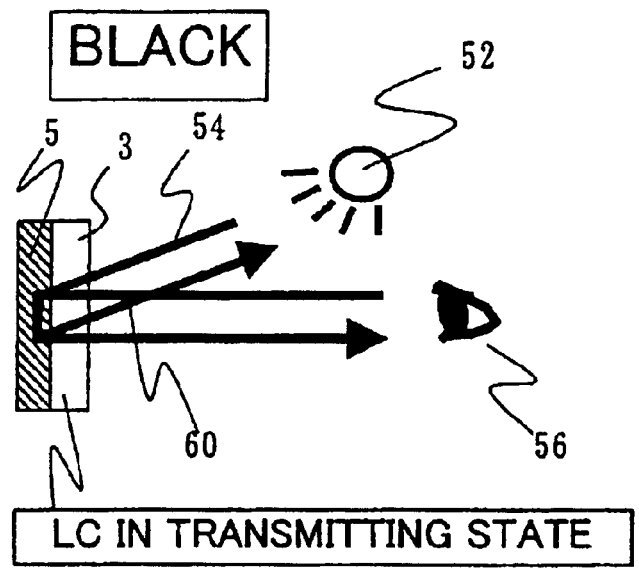
FIGS. 15A and 15B show how a display device including a retroreflector operates.
Figure 15B:
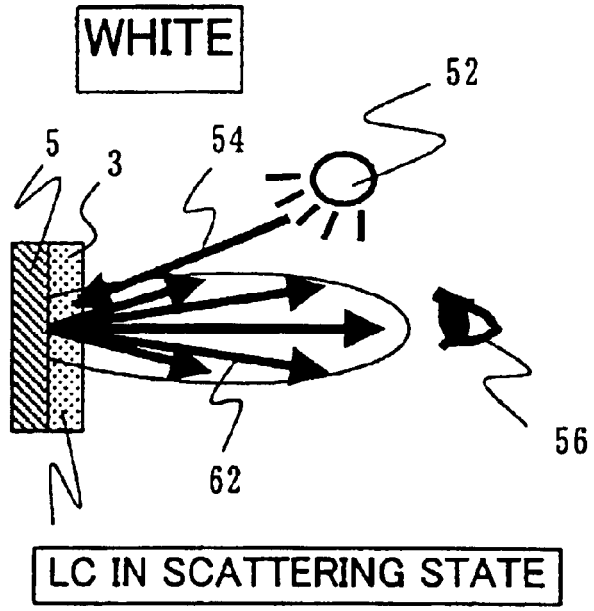

It should be noted that the region where no reflective electrodes are present (i.e., the non-reflecting region 16) may have a shape corresponding to a group of corner cubes as shown in FIG. 10 as long as the non-reflecting region 16 extends along the lowest-level points of the corner cubes.

Also, the reflective electrode layer having the arrangement pattern described above may be easily formed by the same method as that adopted to make the conventional reflective display device. That is to say, the reflective electrode layer may be formed by performing the processing steps of depositing a conductor film over the corner cube array and then patterning the conductor film deposited. To define the above-described arrangement pattern for the reflective electrodes, the conductor film deposited on the corner cube array may be patterned by using a resist pattern corresponding to the arrangement pattern (or a photomask to make that resist pattern).

Embodiment 2

A second specific preferred embodiment of the present invention relates to an arrangement pattern of reflective electrodes that can be used effectively in a situation where the width of a non-reflecting region is much smaller than the pitch of corner cubes.

FIG. 11 shows a portion of a non-reflecting region (or inter-pixel region) 16 according to the second preferred embodiment. As shown in FIG. 11, the non-reflecting region 16 is provided so as to overlap highest-level points ○ of corner cubes, not lowest-level points ● thereof as is done in the first preferred embodiment described above. Also, the non-reflecting region 16 is provided along the edges of the corner cubes. As used herein, the "edges" of corner cubes mean the intersections between multiple planes (e.g., three planes that are opposed substantially perpendicularly to each other in this preferred embodiment) that are combined together to make a convex portion. That is to say, the "edges" are herein equivalent to boundaries between multiple corner cubes.

If the non-reflecting region 16 is provided along the edges in this manner, then the reflective electrode layer may be formed more accurately by patterning a conductor film as described above. The non-reflecting region 16 may be formed by etching the conductor film, for example. In that case, it is rather easy to etch away portions of the conductor film on the edges. Thus, the manufacturing process can be simplified and the patterning accuracy can be improved.

However, as already described for the first preferred embodiment, if the non-reflecting region R2 is provided over the highest-level points or edges of the corner cube array (i.e., so as to overlap multiple adjacent rows of corner cubes), then those adjacent rows of corner cubes will have non-retro-reflecting portions 17 that are symmetric to the non-reflecting region R2. Thus, the retro-reflectivity might further decrease.

Nevertheless, as long as the non-reflecting region 16 has too narrow a width to decrease the retro-reflectivity of the corner cube reflector significantly, the advantages described above are achieved. Thus, the arrangement pattern of this preferred embodiment may sometimes be preferable. On the supposition that the corner cube reflector shown in FIG. 11 should have a retro-reflectivity that is at least equal to that of the corner cube reflector shown in FIG. 10 where the non-reflecting region is made up of a series of corner cubes, the present inventors defined the conditions to adopt the reflective electrode pattern shown in FIG. 11. Hereinafter, it will be described how much the retro-reflectivity decreases when the electrode pattern of this preferred embodiment is adopted.

FIGS. 12A through 12C show the non-reflecting region 16 and the non-retro-reflecting regions 17 of two vertically adjacent corner cubes in a situation where the electrode pattern shown in FIG. 11 is adopted.

As shown in FIG. 12A, the non-reflecting region 16 partially overlaps both of these two vertically adjacent corner cubes. In that case, non-retro-reflecting regions 17 are defined by the non-reflecting region 16 for these two corner cubes. Specifically, as shown in FIG. 12B, portions 17 of the corner cubes that are symmetric to the non-reflecting region 16 become the non-retro-reflecting regions 17. As a result, the regions 18, including the region 16 shown in FIG. 12A and the regions 17 shown in FIG. 12B, are defined as overall non-retro-reflecting regions as shown in FIG. 12C.

Hereinafter, the relationship between the width of the non-reflecting region 16 and the area of the eventual non-retro-reflecting regions 18 will be described. It should be noted that the "area" herein means the total area of those regions as viewed along a normal to the screen of the display device. That is to say, the "area" herein refers to the projection of those regions onto a plane that crosses the normal at right angles.

Supposing the pitch of the corner cubes in the direction in which the centers of the corner cubes are arranged in line is $P_{cc}$ and the width of the non-reflecting region 16 is $\alpha$ as shown in FIG. 12A, the area $S_1$ of the non-retro-reflecting region 18 of the upper corner cube shown in FIG. 12C is given by $$S_1 = \{1-((P_{cc}-\alpha)/P_{cc})^2\} \times S_{cc} \qquad (2)$$

where $S_{cc}$ is the area of the corner cube ($=\sqrt{3}\,P_{cc}^2/2$).

On the other hand, the area $S_2$ of the non-retro-reflecting region 18 of the lower corner cube shown in FIG. 12C is given by $$S_2 = \alpha \times (P_{cc}/\sqrt{3}+\alpha/2\sqrt{3}) \qquad (3)$$

Accordingly, the overall area $S_{line}$ of the non-retro-reflecting regions 18 is given by $$S_{line}=\alpha \times (P_{cc}/\sqrt{3}+\alpha/2\sqrt{3})+\{1-((P_{cc}-\alpha)/P_{cc})^2\} \times S_{cc}=\sqrt{3}/3\,P_{cc}\alpha(4-\alpha/P_{cc}) \qquad (4)$$

These results reveal that the overall area $S_{line}$ of the non-retro-reflecting regions is smaller than the area $S_{cc}$ of the corner cube if $$\alpha/P_{cc} < 2-\sqrt{10}/2$$

is satisfied.

That is to say, if the line width $\alpha$ of the non-reflecting region 16 is somewhat smaller than the pitch $P_{cc}$ of the corner cubes, then the overall area of the non-retro-reflecting regions can be smaller than the area of the corner cube. In that case, the pattern shown in FIG. 11 in which the gap (i.e., the non-reflecting region 16) is provided along the edges of the corner cubes can be adopted. It should be noted that the centerline of the non-reflecting region that extends along the edges is preferably substantially aligned with the boundary (or edges) of the corner cubes.

On the other hand, if the pitch $P_{cc}$ of the corner cubes and the minimum width a of the non-reflecting region R2 satisfy $\alpha/P_{cc}>2-\sqrt{10}/2$ as described above, then the non-reflecting region 16 should not be provided along the edges as is done in this preferred embodiment. This is because the overall area of the non-retro-reflecting regions is greater than the area of the corner cube and the retro-reflectivity decreases significantly. Accordingly, if $\alpha/P_{cc}>2-\sqrt{10}/2$ is satisfied, the reflective electrodes are preferably arranged in the pattern of the first preferred embodiment described above.

Embodiment 3

A third specific preferred embodiment of the present invention relates to the processing step of forming contact holes 7 that connect the reflective electrodes 12 on the interlevel dielectric film 5c electrically to the electrodes 6 under the interlevel dielectric film 5c in the display device 100 of the first preferred embodiment shown in FIG. 4. In the display device 100 including the micro corner cube array 10 and the scattering type liquid crystal layer 30 in combination, the contact holes 7 need to minimize the decrease in aperture ratio due to their presence; and electrically connect the reflective electrodes 12 to the electrodes 19 under the interlevel dielectric film 5c (e.g., the drain electrodes 6 of the TFTs 4) just as intended without disconnecting them from each other.

To minimize the decrease in aperture ratio due to the presence of the contact holes 7, more than one corner cube should not be affected by the patterning processing step of forming the contact holes 7. For that reason, each of the contact holes 7 should be provided inside one corner cube (or unit element).

On the other hand, to prevent the reflective electrodes 12 from being disconnected from the electrodes 19 by way of the contact holes 7, the distance between the electrodes 19 and the reflective electrodes 12 is preferably as short as possible.

In view of these considerations, the contact holes 7 are preferably formed through the concave portions of the corner cubes (around the lowest-level points thereof, in particular). FIG. 13A shows a situation where the contact hole 7 is provided through the lowest-level point of a corner cube, while FIG. 13B shows a situation where the contact hole 7 is provided through the highest-level point of a corner cube. As shown in FIG. 13B, if the contact hole 7 is provided through the highest-level point of a corner cube, the contact hole 7 is so deep that the electrode 19 is easily disconnected from the reflective electrode 12. In addition, shadows 70 may be cast onto adjacent corner cubes. This is because the corner cube with the contact hole 7 has lost some portions as a result of the processing step of forming the contact hole and because the highest-level points thereof are lower than those of the adjacent corner cubes.

In contrast, if the contact hole 7 is provided through the lowest-level point of the corner cube as shown in FIG. 13A, then the contact hole 7 is shallow and the adjacent corner cubes are not affected by the presence of the contact hole 7.

Accordingly, the contact holes 7 are preferably provided inside the concave portions of corner cubes and more preferably provided through the lowest-level points thereof.

Various preferred embodiments of the present invention have been described as being applied to a reflective liquid crystal display device. However, the present invention is also applicable for use in any other type of display device. For example, the present invention is applicable to an EL device including a reflective electrode on a corner cube.

According to various preferred embodiments of the present invention described above, reflective electrodes to be provided as pixel electrodes on a corner cube array are arranged in an appropriate pattern, thereby realizing uniform display performance over the entire screen. In addition, the overall area of retro-reflecting regions can be increased and an image of quality can be displayed at a higher contrast ratio. Furthermore, the predetermined pattern of the reflective electrodes to be provided on the corner cube array can be easily defined and the manufacturing process can be simplified.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A display device comprising:

a light modulating medium layer;

a corner cube array, which is provided on one side of the light modulating medium layer and which includes multiple corner cubes as its unit elements; and a reflective electrode layer, which is provided on the corner cube array with no planarizing layer therebetween, the reflective electrode layer including multiple reflective electrodes that are spaced apart from each other and that are used to apply a voltage to the light modulating medium layer, wherein, when the display device is viewed from over the corner cube array, an arrangement pattern of the corner cubes matches an arrangement pattern of the reflective electrodes in at least one direction so that a pitch of the reflective electrodes is an integral number "n" times lengths of a pitch of the corner cubes in at least one direction, where "n" is an integer.

2. The display device of claim 1, further comprising electrodes, which are provided on the corner cube array so as to be opposed to the reflective electrode layer and which are electrically connected to the reflective electrodes by way of contact holes, and wherein the contact holes are provided through concave portions of the corner cube array.

3. The display device of claim 1, wherein the corner cube array includes multiple surrounding corner cubes that are adjacent to edges of the reflective electrodes, and wherein each said surrounding corner cube is either a corner cube that is partially overlapped by the edge of associated one of the reflective electrodes or a corner cube that is in contact with the edge of the associated reflective electrode, and wherein the reflective electrodes do not cover the lowest-level points of the surrounding corner cubes.

4. A display device comprising:

a light modulating medium layer;

a corner cube array, which is provided on one side of the light modulating medium layer and which includes multiple corner cubes as its unit elements: and a reflective electrode layer which is supported by the corner cube array, the reflective electrode layer including multiple reflective electrodes that are spaced apart from each other and that are used to apply a voltage to the light modulating medium layer, wherein the corner cube array includes multiple surrounding corner cubes that are adjacent to edges of the reflective electrodes, and wherein each said surrounding corner cube is either a corner cube that is partially overlapped by the edge of associated one of the reflective electrodes or a corner cube that is in contact with the edge of the associated reflective electrode, and wherein the reflective electrodes do not cover the lowest-level points of the surrounding corner cubes.

5. A display device comprising:

a light modulating medium layer;

a corner cube array, which is provided on one side of the light modulating medium layer and which includes multiple corner cubes as its unit elements; and a reflective electrode layer, which is provided on the corner cube array and which includes multiple reflective electrodes that are spaced apart from each other and that are used to apply a voltage to the light modulating medium layer, wherein the reflective electrode layer includes a non-reflecting region which is located between adjacent ones of the reflective electrodes, and wherein the corner cube array includes multiple surrounding corner cubes that are adjacent to edges of the reflective electrodes, each of the surrounding corner cubes being either (a) a corner cube that is at least partially overlapped by both at least an associated one of the reflective electrodes and the non-reflecting region or a corner cube that is in contact with or immediately adjacent the edge of the associated reflective electrode, and wherein, in at least one pixel area of the display device, each said surrounding corner cube is adjacent to another one of the corner cubes under the associated reflective electrode, a boundary between the surrounding corner cubes and said adjacent corner cubes under the associated reflective electrode including highest-level points of the surrounding and adjacent corner cubes, the boundary between the associated reflective electrode and the non-reflecting region being either more distant from the center of the reflective electrode than the highest-level points are or as distant from the center of the reflective electrode as the highest-level points are.

6. The display device of claim 5, wherein lowest level points of the surrounding corner cubes which surround one of the reflective electrodes are located in the non-reflecting region and not in a reflecting region under said one reflective electrode.

7. A display device comprising:

a light modulating medium layer;

a corner cube array, which is provided on one side of the light modulating medium layer and which includes multiple corner cubes as its unit elements; and a reflective electrode layer, which is provided on the corner cube array and which includes multiple reflective electrodes that are spaced apart from each other and that are used to apply a voltage to the light modulating medium layer, wherein the reflective electrode layer includes a non-reflecting region, which is located between adjacent ones of the reflective electrodes, and wherein the corner cube array includes multiple surrounding corner cubes that are adjacent to edges of the reflective electrodes, each of the surrounding corner cubes being either a corner cube that is overlapped by both an associated one of the reflective electrodes and the non-reflecting regions or a corner cube that is in contact with or immediately adjacent the edge of the associated reflective electrode, and wherein, in at least one pixel area of the display device, each said surrounding corner cube is adjacent to another one of the corner cubes under the associated reflective electrode, a boundary between the surrounding corner cubes and said adjacent corner cubes under the associated reflective electrode including highest-level points of the surrounding and adjacent corner cubes, the highest-level points being not overlapped by the non-reflecting region.

8. The display device of claim 7, wherein lowest level points of the surrounding corner cubes which surround one of the reflective electrodes are located in the non-reflecting region and not in a reflecting region under said one reflective electrode.

9. The display device of claim 5 or 7, wherein at least part of the non-reflecting region extends along a line that connects together lowest-level points of adjacent ones of the surrounding corner cubes.

10. The display device of claim 9, wherein the non-reflecting region has a minimum width that is smaller than the width of a contact portion between two adjacent ones of the surrounding corner cubes.

11. The display device of claim 10, wherein the minimum width of the non-reflecting region is at most $1/\sqrt{3}$ of a pitch $P_{cc}$ of corner cubes as measured along the line that connects together the lowest-level points of the surrounding corner cubes.

12. The display device of claim 5 or 7, wherein a $\alpha/P_{cc} > 2 - \sqrt{10}/2$ is satisfied, where $P_{cc}$ is a pitch of corner cubes as measured along the line that connects together the lowest-level points of the surrounding corner cubes and a is the minimum width of the non-reflecting region.

13. A display device comprising:

a light modulating medium layer;

a corner cube array, which is provided on one side of the light modulating medium layer and which includes multiple corner cubes as its unit elements; and a reflective electrode layer, which is provided on the corner cube array and which includes multiple reflective electrodes that are spaced apart from each other via a non-reflecting region and that are used to apply a voltage to the light modulating medium layer, the non-reflecting region being located between adjacent ones of the reflective electrodes, wherein a $\alpha/P_{cc} < 2 - \sqrt{10}/2$ is satisfied, where $P_{cc}$ is a pitch of corner cubes as measured along a line that connects together the lowest-level points of the corner cubes and a is the minimum width of the non-reflecting region, and wherein the non-reflecting region extends along edges of consecutive ones of the corner cubes, the edges of the consecutive corner cubes defining a boundary between the consecutive corner cubes.

14. The display device of claim 13, wherein the centerline of the non-reflecting region that extends along the edges is substantially aligned with the boundary between the consecutive corner cubes.

15. The display device of claim 1, 5, 7 or 13, wherein the light modulating medium layer is a liquid crystal layer that exhibits a scattering state and a transmitting state.

16. The display device of claim 1, 5, 7 or 13, wherein reflective planes of the reflective electrodes are substantially parallel to surfaces of the corner cubes.

* * * * *